(12) United States Patent
Benjamin

(10) Patent No.: X9011
(45) Date of Patent: Aug. 17, 1835

(54) CHAIRS

(76) Inventor: Eli F. Benjamin

Eli F. Benjamin
Letters Patent

The Schedule referred to in these Letters Patent and making part of the same containing a description in the words of the said Eli F. Benjamin himself of his improvement in the Manufacturing of chairs.

To all whom these presents shall come

Be it known that I Eli F. Benjamin of the City of Utica County o Oneida & State of New York have invented a new and useful improvement in the Manufacturing of Chairs. This improvement consists in the putting of Chairs together or with Dowells (which improvement) is fully shewn by the description and model of a machine which I also have invented for boring the different parts of the Chairs for the above purpose. The Machine which I now have in use is four feet long, three feet wide and two feet seven and half inches high. the frame part. That part called the table is four feet ten inches long one foot three inches wide & two and half inches thick. On the under side of this table are two circular ways for the purpose of shifting the table to any bevil of the chair. This table rests on square frame work one foot ten inches long.) one foot, eight inches wide & one foot six inches high. On the top of this frame is straight ways on which the circular ways run which gives the motion back and forth to the table. To the bottom of this frame work is attached a lever operated upon by the foot to raise & lower the table. This frame (which is operated by the lever) may be put together by either round or square joints as the mechanick or operator may think proper. and the whole may be made of any kind of timber. That part of the machine called the boring part is about eight inches square & six and quarter inches high. The one one I have now in use has two arbors simillar to turning lathe
arbors with tapered holes in the end to receive the bitts or
augurs. These two arbors are turned by another of the
same kind on which the geering is fixed for running
them. The top of the table is prepared with stops & guides
with screws running in long mortices or what is called slots
& the timber is held to the top of the table by screws & jaws as
the mechanick or operator may think proper. The edge of the table
toward the boring part is prepared in the same manner. After
the back and front posts of the chair are prepared & put togeth-
er, the side of the chair is then set perpendicular against the
edge of the table the bottom resting on what is called a stop
(which is fixed to the table) The table is then turned to the
right bevil of the chair by means of the circular ways (which
operate with nuts & screws) and run up to the bitts or au-
gurs operating the lever & shifting the side of the chair until
bored. That part of the machine which is seperate from the
table is made to fasten to the edge of the table by means
of screws is made in form of the modell with guides stops
& fastenings for the purpose of boring what is called the [illegible]
or slat of the chair. it is hung with hinges to a piece of
timber & fastened to the edge of the table with screws hav-
ing what is called a horse to raise & lower it to suit
the bevil of the chair. it is made portable for convenience
it may be made fast to the table if thought proper.
The whole machine may be varied or altered both in length
width & hight to suit the mechanick or operator The boring
part may be made of any kind of metal or com wood
& may operate with one, two, three or four bitts or augers
or there may be two boring parts attached to the same frame
operating in like manner, it may also be made to operate
without the lever & the whole machine may be propelled
by hand, horse, steam, or water power or even air.

What

United States Patent

What I claim as my improvement in the above art of put-
ting chairs together consists in putting them together by or
with "Dowells" by which means I am able to introduce
a stronger substance for the joints without weakening the
frame of the chair. I also claim the above described form of
machinery for expediting every part of the work. June 13th 1835

Witnesses
Willard Crafts
Edward Shepard

Eli F. Benjamin 71

Exd.
[illegible]

508 words